(12) United States Patent
Zhang et al.

(10) Patent No.: US 11,775,875 B2
(45) Date of Patent: Oct. 3, 2023

(54) METHOD FOR RECOGNIZING FOG CONCENTRATION OF HAZY IMAGE

(71) Applicant: Nanjing University of Posts and Telecommunications, Nanjing (CN)

(72) Inventors: Dengyin Zhang, Nanjing (CN); Jiangwei Dong, Nanjing (CN); Shiqi Zhou, Nanjing (CN); Xuejie Cao, Nanjing (CN); Shasha Zhao, Nanjing (CN)

(73) Assignee: Nanjing University of Posts and Telecommunications, Nanjing (CN)

( * ) Notice: Subject to any disclaimer, the term of this patent is extended or adjusted under 35 U.S.C. 154(b) by 115 days.

(21) Appl. No.: 17/525,947

(22) Filed: Nov. 14, 2021

(65) Prior Publication Data

US 2022/0076168 A1    Mar. 10, 2022

Related U.S. Application Data

(63) Continuation-in-part of application No. PCT/CN2021/093047, filed on May 11, 2021.

(30) Foreign Application Priority Data

May 11, 2020 (CN) .......................... 202010391477.2

(51) Int. Cl.
| | |
|---|---|
| *G06N 20/10* | (2019.01) |
| *G06V 10/56* | (2022.01) |
| *G06F 18/214* | (2023.01) |
| *G06F 18/2411* | (2023.01) |
| *G06F 18/2431* | (2023.01) |

(52) U.S. Cl.
CPC ........... *G06N 20/10* (2019.01); *G06F 18/214* (2023.01); *G06F 18/2411* (2023.01); *G06F 18/2431* (2023.01); *G06V 10/56* (2022.01)

(58) Field of Classification Search
CPC ... G06N 20/10; G06F 18/214; G06F 18/2411; G06F 18/2431; G06V 10/56; G06V 10/764; G06V 20/56; G06V 20/00
See application file for complete search history.

(56) References Cited

U.S. PATENT DOCUMENTS

2017/0176956 A1* 6/2017 Fusi .................. G05B 13/0265

FOREIGN PATENT DOCUMENTS

| CN | 104951805 A | * | 9/2015 | ........... G06K 9/6269 |
|---|---|---|---|---|
| CN | 109961070 A | * | 7/2019 | |
| CN | 110321855 A | * | 10/2019 | |
| CN | 110705619 A | * | 1/2020 | ........... G06K 9/6212 |

* cited by examiner

*Primary Examiner* — Umair Ahsan
(74) *Attorney, Agent, or Firm* — Nitin Kaushik

(57) ABSTRACT

A method for recognizing a fog concentration of a hazy image includes inputting a target hazy image into a pretrained directed acyclic graph (DAG) support vector machine to acquire a fog concentration of the target hazy image. The fog concentration of the target hazy image is represented based on a prebuilt multi-feature model, and the feature vector in the multi-feature model includes at least one of a color feature, a dark channel feature, an information quantity feature and a contrast feature.

7 Claims, 3 Drawing Sheets

METHOD FOR RECOGNIZING FOG CONCENTRATION OF HAZY IMAGE

CROSS-REFERENCE TO RELAYED APPLICATIONS

This application is a continuation-in-part of International Patent Application No. PCT/CN2021/093047 with an international filing date of May 11, 2021, designating the United States, now pending, and further claims foreign priority benefits to Chinese Patent Application No. 202010391477.2 filed May 11, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of image processing and pattern recognition, and more particularly, to a method for recognizing a fog concentration of a hazy image.

In fields such as mobile phone photographing, target recognition, security monitoring, and intelligent transportation, image applications are based on visible input images. However, in bad weather, for example, haze, the absorption and scattering of light by various different suspended matters in the environment results in image color distortion, contrast reduction, unclear texture and difficult recognition of object features, so that the visual effect becomes worse than normal, the post-processing of images is affected, and the application value of images is greatly reduced. Thus, it is necessary to defog a foggy image by an image defogging technology to restore its original color and details, so that the computer vision system can process images normally in hazy weather.

At present, many computer vision systems such as security monitoring and target recognition require algorithms to automatically process images in different fog conditions without manual adjustment. However, the existing image defogging algorithms are not suitable for all foggy conditions. For images with different fog concentrations, it is often necessary to manually adjust algorithm parameters or manually select an optimal algorithm suitable for the situation to achieve better defogging effects, so that the intelligent operations of outdoor image defogging systems cannot be satisfied.

The factors affecting the intelligence of image defogging systems include the following two aspects. First, the input image should have a certain degree of fog. If an image almost without fog is defogged, the visual quality of this image will often be reduced due to excessive improvement of image contrast. Second, the fog concentration of the image is a key factor affecting the defogging effect. Images with different fog concentrations require optimal algorithm parameters or an optimal algorithm suitable for the situation to achieve the better defogging effects. Therefore, recognizing the presence or absence of fog and the fog concentration has an important enlightening effect on the intelligent image defogging. At present, the technologies for recognizing and classifying fog mainly focus on the detection of the presence or absence of fog, but the technologies for recognizing and classifying fog concentrations in images are deficient and have poor effects.

SUMMARY

An objective of the disclosure is to provide a method for recognizing a fog concentration of a hazy image in order to solve the technical problem in the related art that intelligent defogging cannot be realized and the defogging effect is affected since the fog concentration of a hazy image cannot be automatically recognized.

The disclosure provides a method for recognizing a fog concentration of a hazy image, the method comprising:

inputting a target hazy image into a pre-trained directed acyclic graph (DAG) support vector machine to acquire a fog concentration of the target hazy image.

The fog concentration of the target hazy image is represented based on a prebuilt multi-feature model, and the feature vector in the multi-feature model comprises at least one of a color feature, a dark channel feature, an information quantity feature and a contrast feature.

In a class of this embodiment, the color feature is expressed as:

$A(x) = I^v(x) - \alpha \cdot I^s(x);$ where, $$I^v(x) = \max_{C \in \{R,G,B\}} I^C(x);$$

$$I^s(x) = \frac{\max_{C \in \{R,G,B\}} I^C(x) - \min_{C \in \{R,G,B\}} I^C(x)}{\max_{C \in \{R,G,B\}} I^C(x)};$$

where $A(x)$ is a color feature matrix of the image matrix $I(x)$, $I^v(x)$ is a brightness matrix of the image matrix $I(x)$, $I^s(x)$ is a saturation matrix of the image matrix $I(x)$, $\alpha$ is a weight coefficient, and $I^C(x)$ is a certain R,G,B color channel of the image matrix $I(x)$.

In a class of this embodiment, the dark channel feature is expressed as:

$$J^{dark}(x) = \min_{y \in N_r(x)} \left[ \min_{C \in \{R,G,B\}} J^c(y) \right];$$

where $J^{dark}(x)$ is a dark channel feature matrix of the image $J(x)$, $N_r(x)$ denotes a neighborhood using a pixel point x as a center and r as a radius, $J(y)$ is a pixel vale of a certain pixel point y in the neighborhood $N_r(x)$ of the pixel point x, and $J^C(y)$ is a pixel value of a certain R,G,B color channel of $J(y)$.

In a class of this embodiment, the information quantity feature comprises a global entropy and/or a local entropy; the global entropy is expressed as:

$$H_g = -\sum_{i=0}^{255} p_i \log p_i;$$

where $H_g$ is the global entropy of the image, and $p_i$ denotes the proportion of pixels with a gray value of i in the whole image; and the local entropy is expressed as:

$$H(x) = -\sum_{i=0}^{255} p_i(x) \log p_i(x);$$

where H(x) is a local entropy matrix of the image, and $p_i(x)$ denotes the proportion of pixels having the gray value of i in a square local region of the image matrix using a pixel point x as a center and having a window side length of 2r+1 in the total number of pixels in the square local region.

In a class of this embodiment, the contrast feature comprises a global contrast and/or a local contrast;

the global contrast is expressed as:

$$GC = \frac{\sqrt{\frac{1}{h \cdot w}\sum_{x=1}^{h}\sum_{y=1}^{w}(f(x,y)-\bar{f})^2}}{\max(\bar{f}, \varepsilon)};$$

where GC is the global contrast of the image, h is the number of rows of the two-dimensional image matrix, w is the number of columns of the two-dimensional image matrix, $\bar{f}$ is a mean value of the input image f(x,y), and $\varepsilon$ is a zero stopping parameter; and the local contrast is expressed as:

$$LC(x) = \sqrt{\frac{1}{|\Omega_r(x)|}\sum_{y \in \Omega_r(x)}(M(y)-M(x))^2};$$

where LC(x) is a local contrast matrix of the image, $\Omega_r(x)$ is a local region using a pixel point x as a center and r as a radius, $|\Omega_r(x)|$ is the number of pixels in the local region, M(y) is a pixel value of a certain pixel point y in the local region $\Omega_r(x)$ of the pixel point x, and M(x) is a pixel value of the pixel point x in the image matrix.

In a class of this embodiment, the acquired fog concentration of the target hazy image comprises any one of no fog, light fog, moderate fog and thick fog;

a visibility greater than 10000 m is classified into no fog, a visibility in the range of 1001 m to 100000 m is classified into light fog, a visibility in the range of 200 m to 1000 m is classified into moderate fog, and a visibility less than 200 m is classified into thick fog.

In a class of this embodiment, training the DAG support vector machine comprises:

acquiring hazy images with different fog concentrations to build a training set; and inputting the training set into the DAG support vector machine, and supervising and learning a feature vector in a multi-feature model for representing the fog concentration of the hazy image by an S-directed acyclic graph support vector machine (DAGSVM) multi-classification algorithm based on a separability optimized DAG graph.

In a class of this embodiment, supervising and learning a feature vector in a multi-feature model for representing the fog concentration of the hazy image by an S-DAGSVM multi-classification algorithm based on a separability optimized DAG graph comprises:

defining a separability between any two classes of samples in the training set, assuming any two classes of sample sets in the training set as $\{x_1, x_2, \ldots, x_n\}$ and $\{y_1, y_2, \ldots, y_m\}$, defining an inter-class distance $d^Q(e_x^Q, e_y^Q)$ and an intra-class divergence $\sigma_x^Q$ of the two classes of sample sets in a feature space Q after mapping, and combining the inter-class distance and the intra-class divergence to define a separability $S_{ij}^Q = d^Q(e_i^Q, e_j^Q) - \beta(\sigma_i^Q + \sigma_j^Q)$ between a class i and a class j, where $\beta$ is a weight coefficient;

inputting the training set into the DAG support vector machine, and combining various classes of sample sets in the training set in pairs to train two-class SVMs, k(k−1)/2 two-class SVMs for a k-class problem, and the classes correspond to different fog concentrations;

calculating a separability between every two classes according to the separability between the class i and the class j to acquire a separability set $S=\{s_{ij}\}, i \neq j, i,j \in D$, where $s_{ij}=s_{ji}$, and D is a class set in the training set and corresponds to a set of different fog concentrations;

extracting the maximum separability $\max\{s_{ij}\}$ from the separability set, and using a two-class SVM corresponding to the maximum separability as a root node of the DAG graph;

assuming the two-class SVM of the current node as $c_{ij}$, and deciding which two-class SVM to be used in a next layer according to the result of classification of this classifier.

In a class of this embodiment, assuming the two-class SVM of the current node as $c_{ij}$, and deciding which two-class SVM to be used in a next layer according to the result of classification of this classifier comprises:

if the result of classification indicates that it does not belong to the class i, assuming $S=S-\{s_{uv}|u=i \text{ or } v=i\}$, and using a two-class SVM corresponding to the maximum separability in the separability set S at this time as a classifier in the next layer; and if the result of classification indicates that it does not belong to the class j, assuming $S=S-\{s_{uv}|u=j \text{ or } v=j\}$, and using a two-class SVM corresponding to the maximum separability in the separability set S at this time as a classifier in the next layer.

In a class of this embodiment, before inputting the training set into the DAG support vector machine, the method further comprises: normalizing and weighting the feature vector extracted from the training set.

The following advantages are associated with the method for recognizing a fog concentration of a hazy image of the disclosure. The fog concentration of a hazy image is represented based on the prebuilt multi-feature model, and the multi-feature model creatively provides feature vectors such as a color feature, a dark channel feature, an information quantity feature and a contrast feature, so that the data information about the fog concentration in the hazy image is efficiently utilized. When the DAG support vector machine is trained by hazy images represented by different fog images, the feature vector in the multi-feature model is supervised and learnt by an S-DAGSVM multi-classification algorithm based on a separability optimized DAG graph. This algorithm is to optimize the DAG graph based on separability, so that the error rate of classification in a high layer is reduced to the greatest extent, the accuracy of the final result of classification is improved, and good generalization ability and adaptability are realized. Specifically, the method of the disclosure has the following advantages.

(1) The automatic recognition and classification of fog concentrations in images is realized. For images with different fog concentrations, it is unnecessary to manually adjust algorithm parameters or manually select an optimal algorithm or optimal algorithm parameters suitable for the situation, and this operation can be completed by a computer, so that the intelligence of the image defogging system is improved.

(2) The proposed multi-feature model can efficiently represent the fog concentration. The fog concentration of the image is comprehensively represented in multiple aspects by using four highly distinguishing features, i.e., color, dark channel, information quantity and contrast, and the fog concentration is represented by a histogram distribution. Thus, the data information about the fog concentration in the image is efficiently utilized.

(3) By using a DAG support vector machine, the problem that the conventional support vector machine only supports two classes can be solved, so that the situation where there are many classes of fog concentrations in the image can be better adapted.

(4) The proposed S-DAGSVM classification algorithm is to optimize the DAG graph based on separability, so that the error rate of classification in a high layer is reduced to the greatest extent, the accuracy of the final result of classification is improved, and the generalization ability of the model is enhanced.

(5) The S-DAGSVM classification algorithm has the advantages of fast prediction speed or the like of the conventional DAGSVM algorithm, so it is beneficial to realize a computer vision system with high real-time performance.

(6) Many methods related to the mobile phone user's photographing, target recognition, security monitoring, intelligent transportation and other fields in practical applications of images are based on the premise that the input image has good visibility. In the disclosure, by classifying hazy images first and then selecting an optimal defogging algorithm or optimal algorithm parameters suitable for this situation, the original hazy image can be restored more clearly and naturally, which is of great practical significance to enable the computer vision system to operate normally in hazy weather.

DETAILED DESCRIPTION

Figure 1:
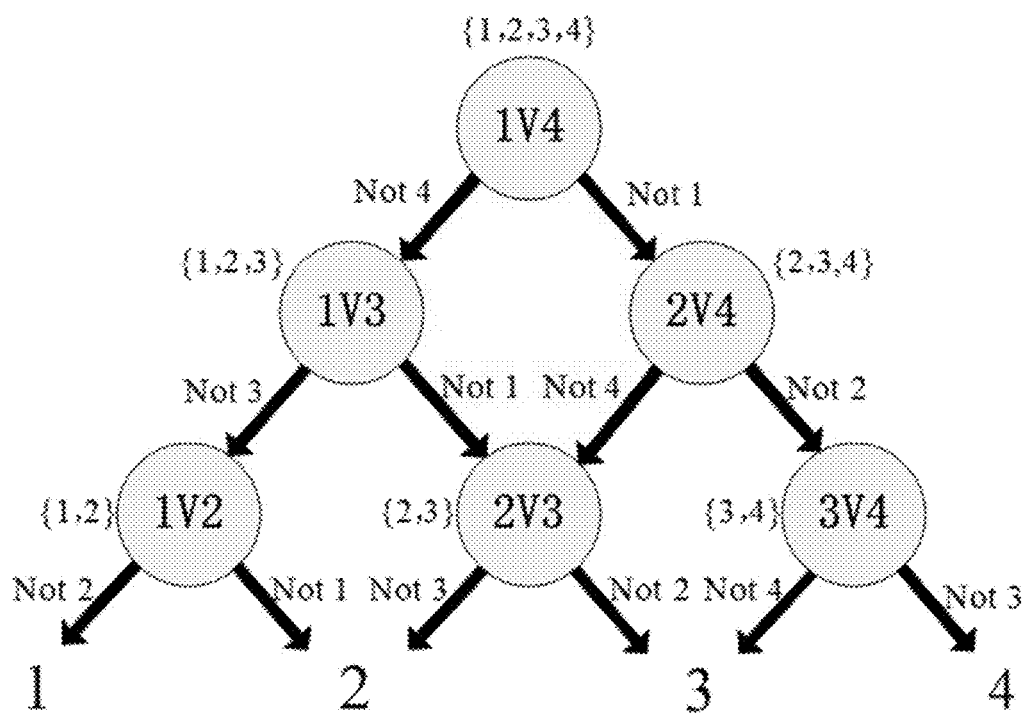
FIG. 1 is a classification diagram of a DAG support vector machine involved in a method for recognizing a fog concentration of a hazy image according to one embodiment of the disclosure.

To further illustrate, embodiments detailing a method for recognizing a fog concentration of a hazy image are described below. It should be noted that the following embodiments are intended to describe and not to limit the disclosure.

The method for recognizing a fog concentration of a hazy image of the disclosure is implemented as follows.

1. Acquisition of a Training Data Set

A foggy image data set having natural images and artificially synthesized images is built. With reference to the standards in the meteorological industry, images are classified into four classes of images according to visibility, i.e., no fog, light fog, moderate fog and thick fog. Different fog levels and their corresponding visibilities are shown in Table 1.

TABLE 1

Different fog levels and their visibilities

| Fog level | Visibility/m |
| --- | --- |
| No fog | Greater than 10000 |
| Light fog | The range of 1001 to 10000 |
| Moderate fog | The range of 200 to 1000 |
| Thick fog | Less than 200 |

To enhance the robustness of the model, the foggy image data set is built in two parts: on one hand, considering the authenticity of fog, natural images with different fog concentrations in the real world are collected from the Internet, and the natural images are classified into four classes (i.e., no fog, light fog, moderate fog and thick fog) according to the fog concentration and visibility. On the other hand, considering the demand for the training sample size, in order to obtain more effective samples, artificially synthesized images with different fog concentrations are synthesized by using outdoor fogless images and field depth maps thereof in the RESIDE data set.

A data set of images with different fog concentrations is established by combining the natural images and the artificially synthesized images. In this embodiment, there are total 5424 images in the established data set, comprising 1356 images without fog, 1356 images with light fog, 1356 images with moderate fog and 1356 images with thick images. The data set is divided into a training set and a test set at a ratio of 7:3. That is, 949 images without fog, 949 images with light fog, 949 images with moderate images and 949 images with thick images are randomly selected from the fog image data set to serve as a training, and the remaining 1628 images are used as a test set.

2. Building a Multi-Feature Model

In the disclosure, a feature model with high discrimination is built from multiple features to represent the fog concentration. By comparing multiple groups of images with different fog concentrations and analyzing the fog formation mechanism and the influence of fog on images, it is observed that images have obvious and stable differences in four features, i.e., color, dark channel, information quantity and contrast. The disclosure proposes that the fog concentration of the image is comprehensively represented in multiple aspects by a multi-feature model combining the four features. In order to further improve the accuracy of classification, in this embodiment, the four features are represented by a histogram, so that the data information about the fog concentration in the image is efficiently utilized. Meanwhile, the global characteristics of the information quantity feature and the contrast feature are counted to assist in representing the fog concentration. Specific definitions are given below.

(1) Color Feature

The HSV (hue, saturation, value) color space model can better match with human visual perception, and is suitable for describing and interpreting images. In the HSV color space model, color parameters are hue (H), saturation (S) and brightness value (V), respectively. Due to the influence of fog, many white components are mixed in images, so the saturation of pixels decreases, and the brightness value increases. The difference between the brightness value and the saturation can be used to describe the fog concentration, and can be defined as a color feature, specifically:

$$A(x) = I^v(x) - \alpha \cdot I^s(x);$$

$$I^v(x) = \max_{C \in \{R,G,B\}} I^C(x);$$

$$I^s(x) = \frac{\max_{C \in \{R,G,B\}} I^C(x) - \min_{C \in \{R,G,B\}} I^C(x)}{\max_{C \in \{R,G,B\}} I^C(x)};$$

where A(x) is a color feature matrix of the image matrix I(x), $I^v(x)$ is a brightness matrix of the image matrix I(x), $I^s(x)$ is a saturation matrix of the image matrix I(x), α is a weight coefficient, and $I^C(x)$ is a certain I(x) color channel of the image matrix R,G,B.

(2) Dark Channel Feature

Based on the statistical observation of lots of images without fog, in a non-sky region in an image without fog, if the image is divided into multiple local regions, the brightness value of at least one color channel of some pixel points in each local region tends to 0, so that a dark channel priori model can be obtained. For any input image J(x), the dark channel feature can be expressed as:

$$J^{dark}(x) = \min_{y \in N_r(x)} \left[ \min_{C \in \{R,G,B\}} J^C(y) \right];$$

where $J^{dark}(x)$ is a dark channel feature matrix of the image J(x), $N_r(x)$ denotes a neighborhood using a pixel point x as a center and r as a radius, J(y) is a pixel vale of a certain pixel point x in the neighborhood $N_r(x)$ of the pixel point y, and $J^C(y)$ is a pixel value of a certain R,G,B color channel of J(y).

(3) Information Quantity Feature

An image entropy represents the information quantity in an image. Compared with an image with fog, an image without fog contains more information. Furthermore, if the fog concentration of the image is higher, less information can be acquired from the image. In this embodiment, a global entropy and a local entropy are used as the information quantity feature of the image to represent the fog concentration of the image.

The global entropy of the image is defined as:

$$H_g = -\sum_{i=0}^{255} p_i \log p_i;$$

where $H_g$ is the global entropy of the image, and $p_i$ denotes the proportion of pixels with a gray value of i in the whole image.

The local entropy of the image is defined as:

$$H(x) = -\sum_{i=0}^{255} p_i(x) \log p_i(x);$$

where H(x) is a local entropy matrix of the image, and $p_i(x)$ denotes the proportion of pixels having a gray value of x in a square local region using a pixel point 2r+1 as a center and having a window side length of i in the total number of pixels in this local region.

(4) Contrast Feature

With the increase of the fog concentration, the contrast of the image will decrease in different degrees. In this embodiment, a global contrast and a local contrast are defined as the contrast feature of the image.

The global contrast of the image is defined as:

$$GC = \frac{\sqrt{\frac{1}{h \cdot w} \sum_{x=1}^{h} \sum_{y=1}^{w} (f(x,y) - \bar{f})^2}}{\max(\bar{f}, \varepsilon)};$$

where GC is the global contrast of the image, h is the number of rows of the two-dimensional image matrix, w is the number of columns of the two-dimensional image matrix, $\bar{f}$ is a mean value of the input image f(x,y), and ε is a zero stopping parameter which is a number slightly greater than zero to prevent the denominator from being 0. In this embodiment, ε=0.1.

The local contrast of the image is defined as:

$$LC(x) = \sqrt{\frac{1}{|\Omega_r(x)|} \sum_{y \in \Omega_r(x)} (M(y) - M(x))^2};$$

where LC(x) is a local contrast matrix of the image, $\Omega_r(x)$ is a local region using a pixel point x as a center and r as a radius, $|\Omega_r(x)|$ is the number of pixels in the local region, M(y) is a pixel value of a certain pixel point y in the local region $\Omega_r(x)$ of the pixel point x, and M(x) is a pixel value of the pixel point x in the image matrix.

(5) Feature Parameters

The color feature, the dark channel feature, the local entropy feature and the local contrast feature are all represented in form of histograms, and different numbers of levels of the histogram have a great impact on the classification effect. By testing the classification performances when the number of levels of the histogram is respectively 8, 16, 32, 64, 128 or 256, it can be known that the classification effect is good when the level of the histogram is 64. At this time, some key information distribution information will not be covered due to a too small number of levels of the histogram, and the information mixed in some unimportant details will not interfere with the classification due to a too large number of levels of the histogram.

After repeated tests, when the radii of the local regions of the dark channel, local entropy and local contrast in the color feature when α=0.62 are 3, 3, and 2, respectively, a better classification effect of the fog concentration can be achieved, and the algorithm has a small amount of calculation and high classification accuracy at this time. Four histogram distribution features and two global features are calculated for each image to obtain a 256-dimensional feature vector, and all feature vectors are merged and normalized to obtain a feature vector set.

3. Separability-Based DAGSVM Multi-Classification Algorithm

In the directed acyclic graph support vector machines (DAGSVM) algorithm, for a k-class problem, k(k−1)/2 two-class support vector machines (SVMs) need to be trained in the training stage. By this algorithm, all two-class SVMs are built into a direction acyclic graph (DAG) structure. The formed DAG graph will comprise k(k−1)/2 branch nodes and k leaf nodes. The branch nodes correspond to the two-class SVMs built in the training stage, and the leaf nodes correspond to sample classes. During the classification of an unknown sample, from the root node, it is determined according to the result of classification whether the classification is performed leftward or rightward until the leaf node appears. The class represented by this leaf node is the class of the unknown sample. A DAGSVM random combination scheme for a 4-class problem is shown in FIG. 4.

In the DAGSVM algorithm, the result can be obtained by using only (k−1) two-class classifier in the prediction stage, so that the classification speed and the classification accuracy are improved. However, in the conventional DAGSVM method, there is an inherent phenomenon of "error accumulation" from up to down in the hierarchical structure. That is, if a classification error occurs at a certain node, the classification error will extend to subsequent nodes after this node. If the classification error occurs closer to the root, the classification performance will be worse. In the conventional DAGSVM method, the selection of the branch node is random in the processing of building the DAG graph, and the decision trend in the prediction stage is also random, so that the possibility of occurrence of classification errors is greatly increased. In view of this problem, in the method of the disclosure, the conventional DAGSVM multi-classification algorithm is optimized according to the separability between different classes of samples, specifically:

3.1 Defining the Separability Between Different Classes of Samples

It can be known from the conventional DAGSVM analysis that the classification performance of a branch node closer to the root node has a larger impact on the generalization and classification accuracy of the whole multi-classification support vector machine classification model. In view of this, the disclosure proposes a multi-classification SVM algorithm (S-DAGSVM) for optimizing the directed acyclic graph (DAG) according to the separability between different classes of samples. Its basic idea is that two classes of samples with a higher separability is separated first in the process of generating the DAG graph.

The decision boundary of the SVM is a hyperplane that solves samples at the maximum classification interval. Therefore, the inter-class distance is an important indicator of the separability between two classes during classification of SVMs. If the inter-class is larger, it is easier to correctly separate the two classes. In the disclosure, the inter-class distance of two classes of sample sets $\{x_1, x_2, \ldots, x_n\}$ and $\{y_1, y_2, \ldots y_m\}$ in a feature space Q after mapping is defined as:

$$d^Q(e_x^Q, e_y^Q) = \sqrt{\frac{1}{n^2}\sum_{i=1}^{n}\sum_{j=1}^{n}K(x_i, x_j) - \frac{1}{nm}\sum_{i=1}^{n}\sum_{j=1}^{m}K(x_i, y_j) - \frac{1}{m^2}\sum_{i=1}^{m}\sum_{j=1}^{m}K(y_i, y_j)};$$

where $$e_x^Q = \frac{1}{n}\sum_{i=1}^{n}\phi(x_i),$$

and $$e_y^Q = \frac{1}{m}\sum_{i=1}^{m}\phi(y_i)$$

are class centers of two classes of sample sets in the feature space Q, respectively, $x_i$ and $x_j$ are the $i^{th}$ sample and the $j^{th}$ sample in the sample set $\{x_1, x_2, \ldots x_n\}$, $y_i$ and $y_j$ are the $i^{th}$ sample and the $j^{th}$ sample in the sample set $\{y_1, y_2, \ldots, y_m\}$, n is the number of samples in the first class of sample sets, m is the number of samples in the second class of sample sets, $\phi$ is a certain nonlinear mapping, and K is a certain kernel function satisfying the Mercer condition.

In addition, the intra-class divergence is also an important indicator of the separability. On one hand, if the intra-class divergence is smaller, it is easier to correctly separate samples. On the other hand, in a case where there is a certain number of samples, the intra-class divergence between samples is smaller, the generalization ability of the model is higher and the classification correctness is higher. For a certain class of sample sets $\{x_1, x_2, \ldots, x_n\}$, in the feature space Q after mapping, the square of the distance from any sample x to its class center is defined as:

$$D^Q(x, e_x^Q) = K(x, x) - \frac{2}{n}\sum_{i=1}^{n}K(x, x_i) + \frac{1}{n^2}\sum_{i=1}^{n}\sum_{j=1}^{n}K(x_i, x_j);$$

Further, in the disclosure, the intra-class divergence of this class of sample sets in the feature space Q after mapping is defined as:

$$\sigma_x^Q = \sqrt{\frac{1}{n-1}\sum_{i=1}^{n}D^Q(x_i, e_x^Q)};$$

Finally, according to the inter-class distance and the intra-class divergence, the separability between a class i and a class j is defined as:

$$S_{ij}^Q = d^Q(e_i^Q, e_j^Q) - \beta(\sigma_i^Q + \sigma_j^Q);$$

where β is a weight coefficient.

3.2 Separability-Based S-DAGSVM Multi-Classification Algorithm

Figure 2:
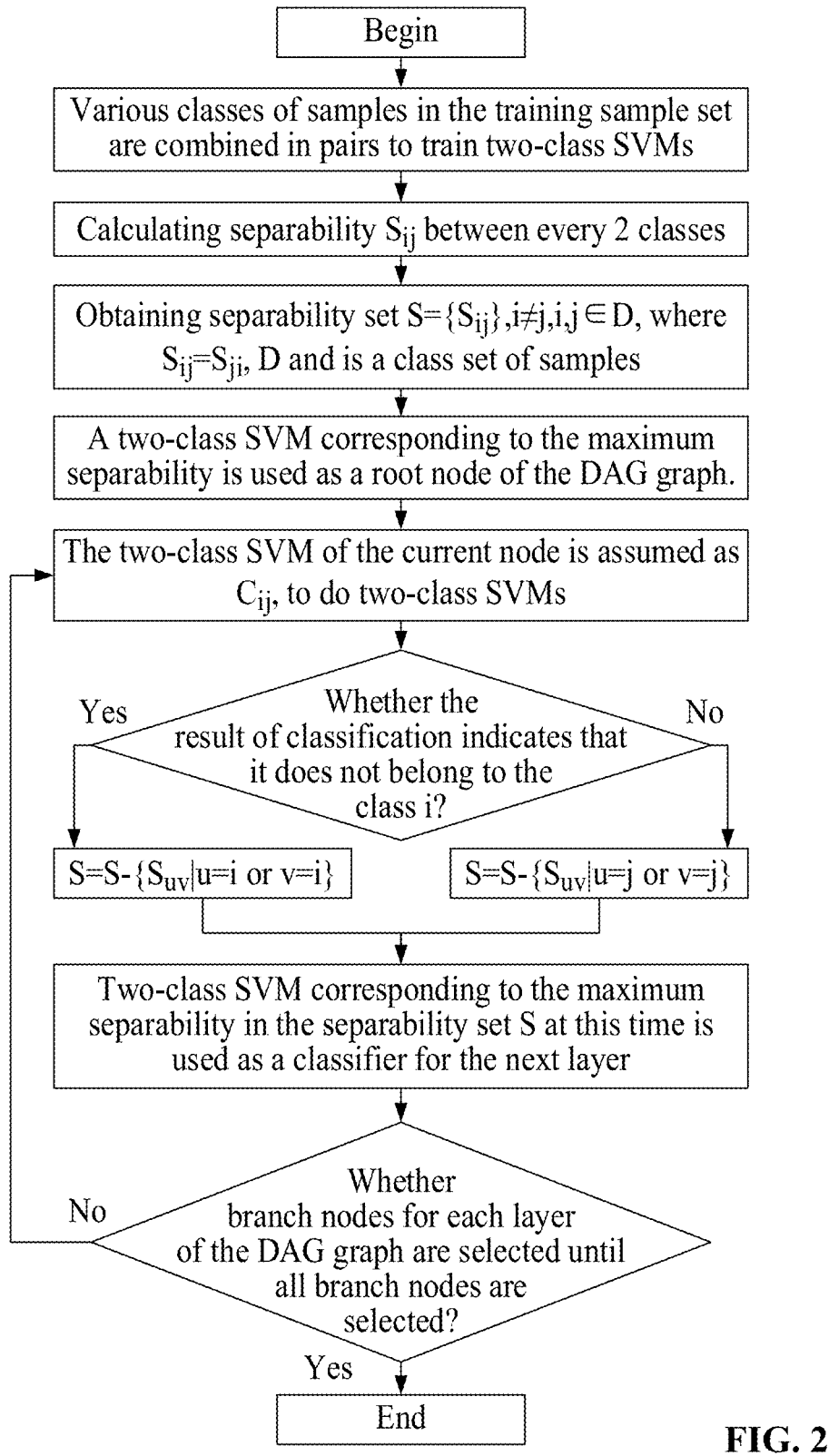
FIG. 2 is a flowchart of a separability-based S-DAGSVM algorithm in a method for recognizing a fog concentration of a hazy image according to one embodiment of the disclosure.

According to the separability between different classes of samples defined in 3.1, the S-DAGSVM algorithm based on a separability optimized DAG graph is shown in FIG. 2, which is a flowchart of the separability-based S-DAGSVM algorithm in an embodiment of the method of the disclosure, comprising the following steps.

Step1: Various classes of samples in the training sample set are combined in pairs to train two-class SVMs, and there will be k(k−1)/2 two-class SVMs for a k-class problem.

Step2: The separability between every 2 classes is calculated according to the separability defined in the disclosure to obtained a separability set $S=\{s_{ij}\}, i \neq j, i,j \in D$, where $s_{ij}=s_{ji}$, D and is a class set of samples.

Step3: A two-class SVM corresponding to the maximum separability is used as a root node of the DAG graph.

Step4: The two-class SVM of the current node is assumed as $c_{ij}$, and which two-class SVM to be used in a next layer is decided according to the result of classification of the classifier: if the result of classification indicates that it does not belong to the class i, S=S−{$s_{uv}$|u=i or v=i}, and the two-class SVM corresponding to the maximum separability in the separability set S at this time is used as a classifier for the next layer; and, if the result of classification indicates that it does not belong to the class j, S=S−{$s_{uv}$|u=j or v=j}, and two-class SVM corresponding to the maximum separability in the separability set S at this time is used as a classifier for the next layer.

Step5: Branch nodes for each layer of the DAG graph are selected in the way in Step4 until all branch nodes are selected, a separability optimized DAG graph is generated to obtain a final S-DAGSVM classification model.

Step6: The algorithm ends.

4. Classification and Recognition of Fog Concentrations of Images

Figure 3:
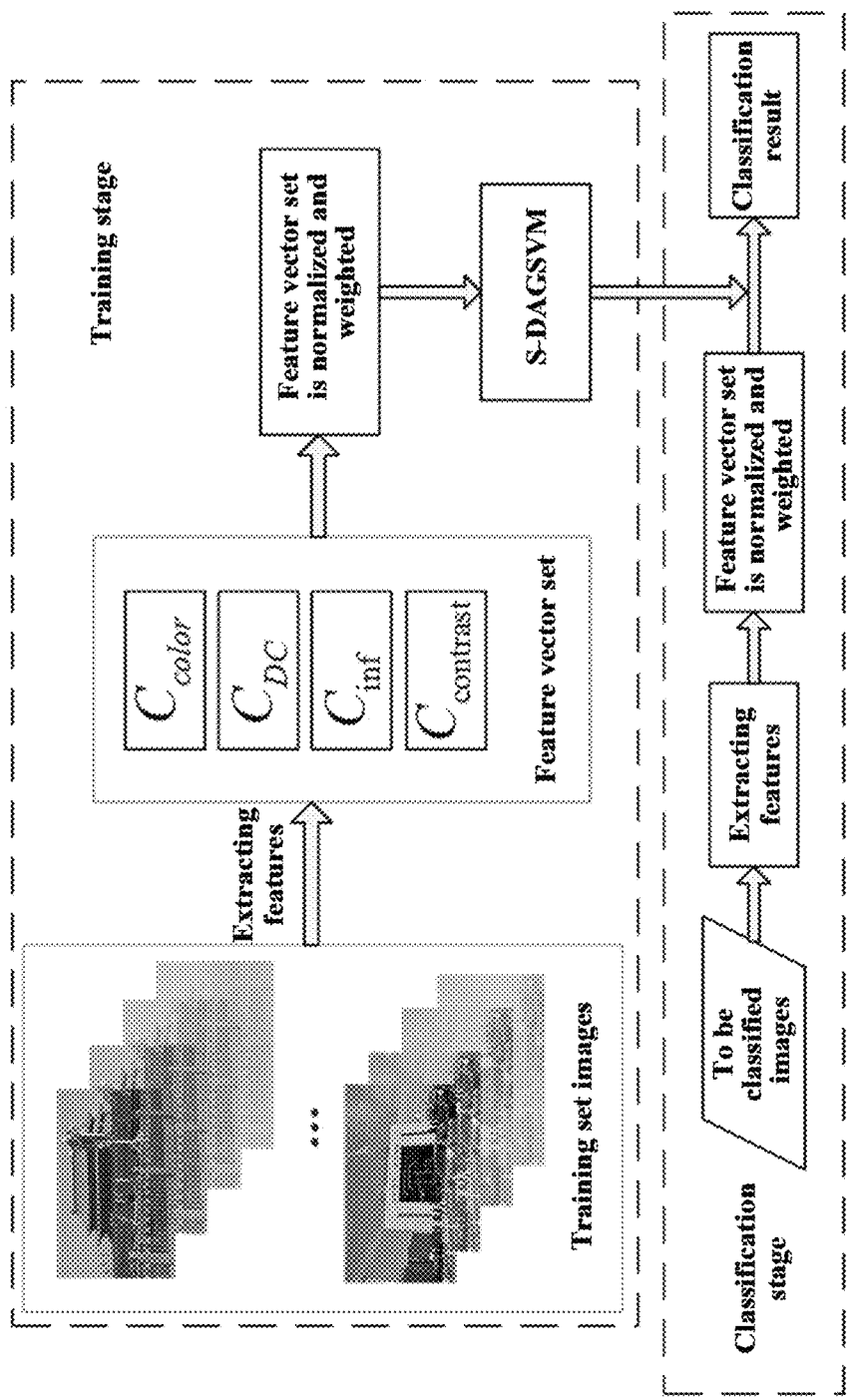
FIG. 3 is an overall flowchart of a method for recognizing a fog concentration of a hazy image according to one embodiment of the disclosure.

Based on the above-described multi-feature model and S-DAGSVM multi-classification algorithm, the method for classifying fog concentrations of images is implemented as shown in FIG. 3, which is an overall flowchart of an embodiment of the method of the disclosure. The whole process can be divided into two parts, i.e., a training stage and a classification stage. In the training stage, feature vectors of images in a training set are extracted to form a feature vector set, and the feature vector set is normalized and weighted. In this embodiment, the weights for the four features color, dark channel, information quantity and contrast are assigned as (1.6 2.1 2.4 1), and an S-DAGSVM multi-classification model is trained by using the preprocessed feature vector set and class tag thereof to obtain an image fog concentration classification model. In the classification stage, feature vectors of images to be classified are extracted and then normalized and weighted in the same way, and the preprocessed feature vectors are input the trained image fog concentration classification model to finally obtain a result of classification of fog concentrations of the images. In this way, the fog concentration of any input image can be classified and recognized.

It will be obvious to those skilled in the art that changes and modifications may be made, and therefore, the aim in the appended claims is to cover all such changes and modifications.

What is claimed is:

1. A method for recognizing a fog concentration of a hazy image, the method comprising:
inputting a target hazy image into a pre-trained directed acyclic graph (DAG) support vector machine to acquire a fog concentration of the target hazy image;
wherein:
the fog concentration of the target hazy image is represented based on a prebuilt multi-feature model, and a feature vector in the prebuilt multi-feature model comprises at least one of a color feature, a dark channel feature, an information quantity feature, and a contrast feature;
wherein the color feature is expressed as:

$$A(x) = I^v(x) - \alpha \cdot I^s(x);$$

where, $$I^v(x) = \max_{C \in \{R,G,B\}} I^C(x);$$

$$I^s(x) = \frac{\max_{C \in \{R,G,B\}} I^C(x) - \min_{C \in \{R,G,B\}} I^C(x)}{\max_{C \in \{R,G,B\}} I^C(x)};$$

where A(x) is a color feature matrix of an image matrix I(x), $I^v(x)$ is a brightness matrix of the image matrix I(x), $I^s(x)$ is a saturation matrix of the image matrix I(x), $\alpha$ is a weight coefficient, and $I^C(x)$ is a certain R,G,B color channel of the image matrix I(x).

2. The method of claim 1, wherein the dark channel feature is expressed as:

$$J^{dark}(x) = \min_{y \in N_r(x)} \left[ \min_{C \in \{R,G,B\}} J^C(y) \right];$$

where $J^{dark}(x)$ is a dark channel feature matrix of an image J(x), $N_r(x)$ denotes a neighborhood using a pixel point x as a center and r as a radius, J(y) is a pixel vale of a certain pixel point y in the neighborhood $N_r(x)$ of the pixel point x, and $J^C(y)$ is a pixel value of a certain R,G,B color channel of J(y).

3. The method of claim 1, wherein the information quantity feature comprises a global entropy and/or a local entropy;
the global entropy is expressed as:

$$H_g = -\sum_{i=0}^{255} p_i \log p_i;$$

where $H_g$ is the global entropy of the target hazy image, and $p_i$ denotes a proportion of pixels with a gray value of i in the image; and
the local entropy is expressed as:

$$H(x) = -\sum_{i=0}^{255} p_i(x) \log p_i(x);$$

where H(x) is a local entropy matrix of the image, and $p_i(x)$ denotes a proportion of pixels having the gray value of i in a square local region of the image matrix using a pixel point x as a center and having a window side length of 2r+1 in a total number of pixels in the square local region.

4. The method of claim 1, wherein the contrast feature comprises a global contrast and/or a local contrast;
the global contrast is expressed as:

$$GC = \frac{\sqrt{\frac{1}{h \cdot w} \sum_{x=1}^{h} \sum_{y=1}^{w} (f(x,y) - \bar{f})^2}}{\max(\bar{f}, \varepsilon)};$$

where GC is the global contrast of the target hazy image, h is a number of rows of a two-dimensional image matrix, w is a number of columns of the two-dimensional image matrix, $\bar{f}$ is a mean value of an input image f(x,y), and ε is a zero stopping parameter; and the local contrast is expressed as:

$$LC(x) = \sqrt{\frac{1}{|\Omega_r(x)|} \sum_{y \in \Omega_r(x)} (M(y) - M(x))^2};$$

where LC(x) is a local contrast matrix of the image, $\Omega_r(x)$ is a local region using a pixel point x as a center and r as a radius, $|\Omega_r(x)|$ is a number of pixels in the local region, M(y) is a pixel value of a certain pixel point y in the local region $\Omega_r(x)$ of the pixel point x, and M(x) is a pixel value of the pixel point x in the two-dimensional image matrix.

5. The method of claim 1, wherein the fog concentration of the target hazy image comprises any one of no fog, light fog, moderate fog, and thick fog;

a visibility greater than 10000 m is classified into no fog, a visibility in the range of 1001 m to 100000 m is classified into light fog, a visibility in the range of 200 m to 1000 m is classified into moderate fog, and a visibility less than 200 m is classified into thick fog.

6. A method for recognizing a fog concentration of a hazy image, the method comprising:

inputting a target hazy image into a pre-trained directed acyclic graph (DAG) support vector machine to acquire a fog concentration of the target hazy image;

wherein:

the fog concentration of the target hazy image is represented based on a prebuilt multi-feature model, and a feature vector in the prebuilt multi-feature model comprises at least one of a color feature, a dark channel feature, an information quantity feature, and a contrast feature;

wherein training the DAG support vector machine comprises:

acquiring hazy images with different fog concentrations to build a training set; and inputting the training set into the DAG support vector machine, and supervising and learning the feature vector in a multi-feature model for representing the fog concentration of the hazy image by an S-directed acyclic graph support vector machine (DAGSVM) multi-classification algorithm based on a separability optimized DAG graph;

wherein supervising and learning a feature vector in a multi-feature model for representing the fog concentration of the hazy image by an S-DAGSVM multi-classification algorithm based on a separability optimized DAG graph comprises:

defining a separability between any two classes of samples in the training set, assuming any two classes of sample sets in the training set as $\{x_1, x_2, \ldots x_n\}$ and $\{y_1, y_2, \ldots, y_m\}$, defining an inter-class distance $d^Q(e_x^Q, e_y^Q)$ and an intra-class divergence $\sigma_x^Q$ of the two classes of sample sets in a feature space Q after mapping, and combining the inter-class distance and the intra-class divergence to define a separability $S_{ij}^Q = d^Q(e_i^Q, e_j^Q) - \beta(\sigma_i^Q + \sigma_j^Q)$ between a class i and a class j, where β is a weight coefficient;

inputting the training set into the DAG support vector machine, and combining various classes of sample sets in the training set in pairs to train two-class SVMs, k(k−1)/2 two-class SVMs for a k-class problem, and the classes correspond to different fog concentrations;

calculating a separability between every two classes according to the separability between the class i and the class j to acquire a separability set $S = \{s_{ij}\}, i \neq j, i, j \in D$, where $s_{ij} = s_{ji}$, and D is a class set in the training set and corresponds to a set of different fog concentrations;

extracting a maximum separability $\max\{s_{ij}\}$ from the separability set, and using a two-class SVM corresponding to the maximum separability as a root node of the DAG graph; and assuming the two-class SVM of a current node as $c_{ij}$, and deciding which two-class SVM to be used in a next layer according to a result of classification of the two-class SVM of a current node.

7. The method of claim 6, wherein assuming the two-class SVM of the current node as $c_{ij}$, and deciding which two-class SVM to be used in a next layer according to the result of classification of this classifier comprises:

if the result of Classification indicates that it does not belong to the class i, assuming $S = S - \{s_{uv} | u = i \text{ or } v = i\}$, and using a two-class SVM corresponding to the maximum separability in the separability set S at this time as a classifier in the next layer; and if the result of classification indicates that it does not belong to the class j, assuming $S = S - \{s_{uv} | u = j \text{ or } v = j\}$, and using a two-class SVM corresponding to the maximum separability in the separability set S at this time as a classifier in the next layer.

* * * * *